(12) United States Patent
Dorogusker et al.

(10) Patent No.: US 10,242,357 B1
(45) Date of Patent: Mar. 26, 2019

(54) CONFIGURATION OF A PAYMENT OBJECT READER

(71) Applicant: Square, Inc., San Francisco, CA (US)

(72) Inventors: Jesse Dorogusker, Palo Alto, CA (US); Thomas B Templeton, San Francisco, CA (US); Eric Manago, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 474 days.

(21) Appl. No.: 14/861,398

(22) Filed: Sep. 22, 2015

Related U.S. Application Data

(60) Provisional application No. 62/187,070, filed on Jun. 30, 2015.

(51) Int. Cl.
*G06Q 20/34* (2012.01)
*G06Q 20/20* (2012.01)

(52) U.S. Cl.
CPC .......... *G06Q 20/356* (2013.01); *G06Q 20/20* (2013.01); *G06Q 20/204* (2013.01)

(58) Field of Classification Search
CPC ..... G06Q 20/356; G06Q 20/20; G06Q 20/204
See application file for complete search history.

(56) References Cited

U.S. PATENT DOCUMENTS

| | | | |
|---|---|---|---|
| 5,434,395 A | 7/1995 | Storck et al. | |
| 5,679,945 A * | 10/1997 | Renner | G06K 7/0008 235/441 |
| D405,070 S | 2/1999 | Kitagawa et al. | |
| D411,524 S | 6/1999 | Kitagawa et al. | |
| 6,167,383 A * | 12/2000 | Henson | G06Q 10/087 703/13 |

(Continued)

FOREIGN PATENT DOCUMENTS

| | | |
|---|---|---|
| EP | 2 136 499 A1 | 12/2009 |
| EP | 3 361 455 A1 | 8/2018 |

(Continued)

OTHER PUBLICATIONS

Huang, Samuel H., Sunil K. Sheoran, and Harshal Keskar. "Computer-assisted supply chain configuration based on supply chain operations reference (SCOR) model." Computers & Industrial Engineering 48.2 (2005): 377-394.*

(Continued)

*Primary Examiner* — Asfand M Sheikh
(74) *Attorney, Agent, or Firm* — Lee & Hayes, P.C.

(57) ABSTRACT

In some examples, disclosed methods and systems may configure using a proxy payment object a payment object reader to accept one or more payment objects. The method includes receiving, as an input from a merchant and in a specific manner, at least one object into a payment object reader communicatively coupled to a point-of-sale (POS) terminal. A portion of read-data is compared to a proxy payment object syntax. In response to obtaining a match between the read-data and the proxy payment object syntax with the read-data, the received object is determined to be a proxy payment object. A configuration component then generates a set of configuration instructions which when executed on the payment object reader and/or the POS terminal configures the payment object reader to accept one or more payment objects towards a payment transaction.

24 Claims, 6 Drawing Sheets

(56) References Cited

U.S. PATENT DOCUMENTS

| | | | |
|---|---|---|---|
| D491,953 S | 6/2004 | Arakaki et al. | |
| D495,700 S | 9/2004 | Mukai et al. | |
| D500,039 S | 12/2004 | Chen | |
| D537,445 S | 2/2007 | Bousfield | |
| D598,013 S | 8/2009 | Ju et al. | |
| D624,912 S | 10/2010 | Chen et al. | |
| D624,915 S | 10/2010 | Ferreira Sanchez | |
| 7,860,789 B2* | 12/2010 | Hirka | G06Q 20/04 705/39 |
| D641,740 S | 7/2011 | Jeon et al. | |
| D650,377 S | 12/2011 | Akana et al. | |
| D653,664 S | 2/2012 | Turnbull et al. | |
| D654,885 S | 2/2012 | Isaias | |
| D656,097 S | 3/2012 | Nomi et al. | |
| D657,784 S | 4/2012 | Akana et al. | |
| D660,834 S | 5/2012 | Akana et al. | |
| D675,173 S | 1/2013 | Paradise et al. | |
| D676,047 S | 2/2013 | White et al. | |
| D680,537 S | 4/2013 | Miller et al. | |
| D681,639 S | 5/2013 | Cruz et al. | |
| D686,198 S | 7/2013 | Lewis et al. | |
| D688,241 S | 8/2013 | Miller et al. | |
| D696,255 S | 12/2013 | Bousfield et al. | |
| D700,606 S | 3/2014 | Lo | |
| D702,239 S | 4/2014 | Lee et al. | |
| D704,176 S | 5/2014 | Kwak et al. | |
| D705,201 S | 5/2014 | Isaacs et al. | |
| D706,266 S | 6/2014 | Rotsaert | |
| D709,069 S | 7/2014 | Cruz et al. | |
| D711,876 S | 8/2014 | McWilliam et al. | |
| 8,818,867 B2 | 8/2014 | Baldwin et al. | |
| D716,304 S | 10/2014 | Orthey | |
| D719,561 S | 12/2014 | Akana et al. | |
| 9,058,172 B2 | 6/2015 | Babu et al. | |
| 9,063,737 B2 | 6/2015 | Babu et al. | |
| D736,207 S | 8/2015 | Bousfield et al. | |
| D740,285 S | 10/2015 | Templeton | |
| D740,286 S | 10/2015 | Templeton | |
| D740,819 S | 10/2015 | Weber et al. | |
| D740,820 S | 10/2015 | Templeton et al. | |
| 9,390,297 B2 | 7/2016 | Babu et al. | |
| D766,238 S | 9/2016 | Nguyen | |
| D766,901 S | 9/2016 | Nguyen | |
| 9,507,972 B2 | 11/2016 | Babu et al. | |
| D774,510 S | 12/2016 | Rotsaert | |
| D776,658 S | 1/2017 | Zhu et al. | |
| 9,542,678 B1 | 1/2017 | Glashan et al. | |
| 9,576,159 B1 | 2/2017 | Templeton et al. | |
| D780,731 S | 3/2017 | Kim et al. | |
| D797,739 S | 9/2017 | Templeton | |
| D797,740 S | 9/2017 | Nguyen | |
| 9,800,293 B2* | 10/2017 | Smith | H04B 5/0031 |
| 9,864,424 B1 | 1/2018 | Templeton et al. | |
| 9,870,557 B2 | 1/2018 | Babu et al. | |
| 2003/0009705 A1 | 1/2003 | Thelander et al. | |
| 2004/0056091 A1 | 3/2004 | Overhultz et al. | |
| 2004/0087339 A1 | 5/2004 | Goldthwaite et al. | |
| 2004/0177132 A1 | 9/2004 | Zhang et al. | |
| 2006/0142058 A1 | 6/2006 | Elias et al. | |
| 2006/0157565 A1 | 7/2006 | Shiomi | |
| 2006/0219776 A1 | 10/2006 | Finn | |
| 2007/0079156 A1 | 4/2007 | Fujimoto | |
| 2007/0147332 A1 | 6/2007 | Lappetelainen et al. | |
| 2008/0287062 A1 | 11/2008 | Claus et al. | |
| 2009/0106571 A1 | 4/2009 | Low et al. | |
| 2009/0291705 A1 | 11/2009 | Bennett | |
| 2010/0070785 A1 | 3/2010 | Fallin et al. | |
| 2010/0308976 A1 | 12/2010 | Seban et al. | |
| 2011/0070834 A1 | 3/2011 | Griffin et al. | |
| 2011/0096710 A1 | 4/2011 | Liu et al. | |
| 2011/0110263 A1 | 5/2011 | Yi et al. | |
| 2011/0153437 A1* | 6/2011 | Archer | G06Q 20/10 705/17 |
| 2011/0312271 A1* | 12/2011 | Ma | H04B 5/00 455/41.1 |
| 2012/0016760 A1 | 1/2012 | Lee et al. | |
| 2012/0118959 A1 | 5/2012 | Sather et al. | |
| 2012/0126011 A1 | 5/2012 | Lamba et al. | |
| 2012/0132712 A1 | 5/2012 | Babu et al. | |
| 2012/0150673 A1* | 6/2012 | Hart | G06Q 20/204 705/17 |
| 2012/0312879 A1 | 12/2012 | Rolin et al. | |
| 2013/0052950 A1 | 2/2013 | Hillan et al. | |
| 2013/0069768 A1 | 3/2013 | Madhyastha et al. | |
| 2013/0117139 A1 | 5/2013 | DiMattina et al. | |
| 2013/0124348 A1* | 5/2013 | Lal | G06Q 20/204 705/17 |
| 2013/0163510 A1 | 6/2013 | Chakravarthy et al. | |
| 2013/0166402 A1* | 6/2013 | Parento | G06Q 20/20 705/21 |
| 2013/0256414 A1 | 10/2013 | Liu et al. | |
| 2013/0314214 A1 | 11/2013 | Leica et al. | |
| 2014/0149240 A1 | 5/2014 | Ansel et al. | |
| 2014/0157016 A1 | 6/2014 | Rajagopal | |
| 2014/0171108 A1 | 6/2014 | Waters et al. | |
| 2014/0372781 A1 | 12/2014 | Klappert | |
| 2015/0058227 A1 | 2/2015 | Dua | |
| 2015/0127182 A1 | 5/2015 | Inagi et al. | |
| 2015/0248152 A1 | 9/2015 | Postea et al. | |
| 2016/0117813 A1 | 4/2016 | Gross et al. | |
| 2017/0286943 A1 | 10/2017 | Glashan et al. | |
| 2017/0289795 A1 | 10/2017 | Glashan et al. | |

FOREIGN PATENT DOCUMENTS

| | | |
|---|---|---|
| KR | 10-1140919 B1 | 5/2012 |
| WO | 2012/003892 A1 | 1/2012 |
| WO | 2014/008310 A1 | 1/2014 |
| WO | 2014/106183 A1 | 7/2014 |
| WO | 2017/173126 A1 | 10/2017 |
| WO | 2018/118332 A1 | 6/2018 |

OTHER PUBLICATIONS

Non-Final Office Action dated May 8, 2014, for U.S. Appl. No. 13/603,941, of Babu, A., et al., filed Sep. 5, 2012.

Non-Final Office Action dated May 12, 2014, for U.S. Appl. No. 13/603,992, of Babu, A., et al., filed Sep. 5, 2012.

Notice of Allowance dated Feb. 9, 2015, for U.S. Appl. No. 13/603,992, of Babu, A., et al., filed Sep. 5, 2012.

Notice of Allowance dated Feb. 17, 2015, for U.S. Appl. No. 13/603,941, of Babu, A., et al., filed Sep. 5, 2012.

Ex Parte Quayle Action mailed Apr. 9, 2015, for Design U.S. Appl. No. 29/447,767, of Templeton, T., filed Mar. 6, 2013.

Notice of Allowance dated Jun. 5, 2015, for Design U.S. Appl. No. 29/447,767, of Templeton, T., filed Mar. 6, 2013.

Non-Final Office Action dated Jul. 9, 2015, for U.S. Appl. No. 14/709,375, of Babu, A., et al., filed May 11, 2015.

Certificate of Industrial Design Registration for European Design Patent Application No. 002873877-0001, mailed Nov. 23, 2015.

Certificate of Industrial Design Registration for European Design Patent Application No. 002873877-0002, mailed Nov. 23, 2015.

Examination Report for European Design Patent Application No. 002873877-00011002873877-0002, dated Dec. 31, 2015.

Certificate of Industrial Design Registration for Australian Design Patent Application No. 201516289 mailed Dec. 15, 2015.

Certificate of Industrial Design Registration for Australian Design Patent Application No. 201516287 mailed Dec. 15, 2015.

Non-Final Office Action dated Jan. 21, 2016, for U.S. Appl. No. 14/709,375, of Babu, A., et al., filed May 11, 2015.

First Examination Report for Indian Design Patent Application No. 277744, dated Mar. 8, 2016.

Notice of Allowance dated Mar. 9, 2016, for U.S. Appl. No. 14/874,301, of Babu, A., et al., filed Oct. 2, 2015.

First Examination Report for Indian Design Patent Application No. 277745, dated Mar. 11, 2016.

English-language translation of First Office Action for Japanese Design Patent Application No. 2015-026523, dated Mar. 15, 2016.

(56) References Cited

OTHER PUBLICATIONS

English-language translation of First Office Action for Japanese Design Patent Application No. 2015-026521, dated Mar. 15, 2016.
Notice of Allowance dated May 17, 2016, for Design U.S. Appl. No. 29/528,683, of Nguyen, A.P., filed May 29, 2015.
Notice of Allowance dated May 17, 2016, for Design U.S. Appl. No. 29/532,633, of Nguyen, A.P., filed Jul. 8, 2015.
Certificate of Industrial Design Registration for Canadian Design Patent Application No. 165621 mailed on Jun. 23, 2016.
Certificate of Industrial Design Registration for Canadian Design Patent Application No. 165620 mailed on Jun. 23, 2016.
English-language translation of Decision of Registration for Japanese Design Patent Application No. 2015-026523, mailed Jul. 5, 2016.
English-language translation of Decision of Registration for Japanese Design Patent Application No. 2015-026521, mailed Jul. 5, 2016.
Notice of Allowance dated Jul. 28, 2016, for U.S. Appl. No. 14/709,375, of Babu, A., et al., filed May 11, 2015.
Certificate of Industrial Design Registration for Japanese Design Patent Application No. 2015-026523, mailed Aug. 12, 2016.
Certificate of Industrial Design Registration for Japanese Design Patent Application No. 2015-026521, mailed Aug. 12, 2016.
Certificate of Industrial Design Registration for Indian Design Patent Application No. 277744, mailed Aug. 23, 2016.
Notice of Allowance dated Aug. 30, 2016, for U.S. Appl. No. 15/088,013, of Glashan, R., et al., filed Mar. 31, 2016.
Certificate of Industrial Design Registration for Indian Design Patent Application No. 277745, mailed Sep. 26, 2016.
Office Action for European Patent Application No. 13 740 420.8, dated Feb. 7, 2017.
Non-Final Office Action dated Mar. 22, 2017, for U.S. Appl. No. 15/390,247, of Templeton, T., et al., filed Dec. 23, 2016.
Notice of Allowance dated May 12, 2017, for Design U.S. Appl. No. 29/575,535, of Nguyen, A.P., filed Aug. 25, 2016.
Non-Final Office Action dated May 19, 2017, for U.S. Appl. No. 15/336,597, of Babu, A., et al., filed Oct. 27, 2016.
Notice of Allowance dated Jun. 12, 2017, for Design U.S. Appl. No. 29/539,783, of Templeton, T., filed Sep. 17, 2015.
Notice of Allowance dated Aug. 30, 2017, for U.S. Appl. No. 15/390,247, of Templeton, T., et al., filed Dec. 23, 2016.
Notice of Allowance dated Sep. 8, 2017, for U.S. Appl. No. 15/336,597, of Babu, A., et al., filed Oct. 27, 2016.
Corrected Notice of Allowance dated Sep. 25, 2017, for U.S. Appl. No. 15/390,247, of Templeton, T., et al., filed Dec. 23, 2016.
Non-Final Office Action dated May 3, 2018, for U.S. Appl. No. 15/088,021, of Glashan, R., et al., filed Mar. 31, 2016.
International Search Report and Written Opinion for International Patent Application No. PCT/US2013/049162, dated Oct. 16, 2013.
International Search Report and Written Opinion for International Application No. PCT/US2017/025106, dated Jul. 3, 2017.
International Search Report and Written Opinion for International Application No. PCT/US2017/062890, dated Jan. 22, 2018.
Extended European Search Report for European Patent Application No. 18159594.3, dated May 8, 2018.

* cited by examiner

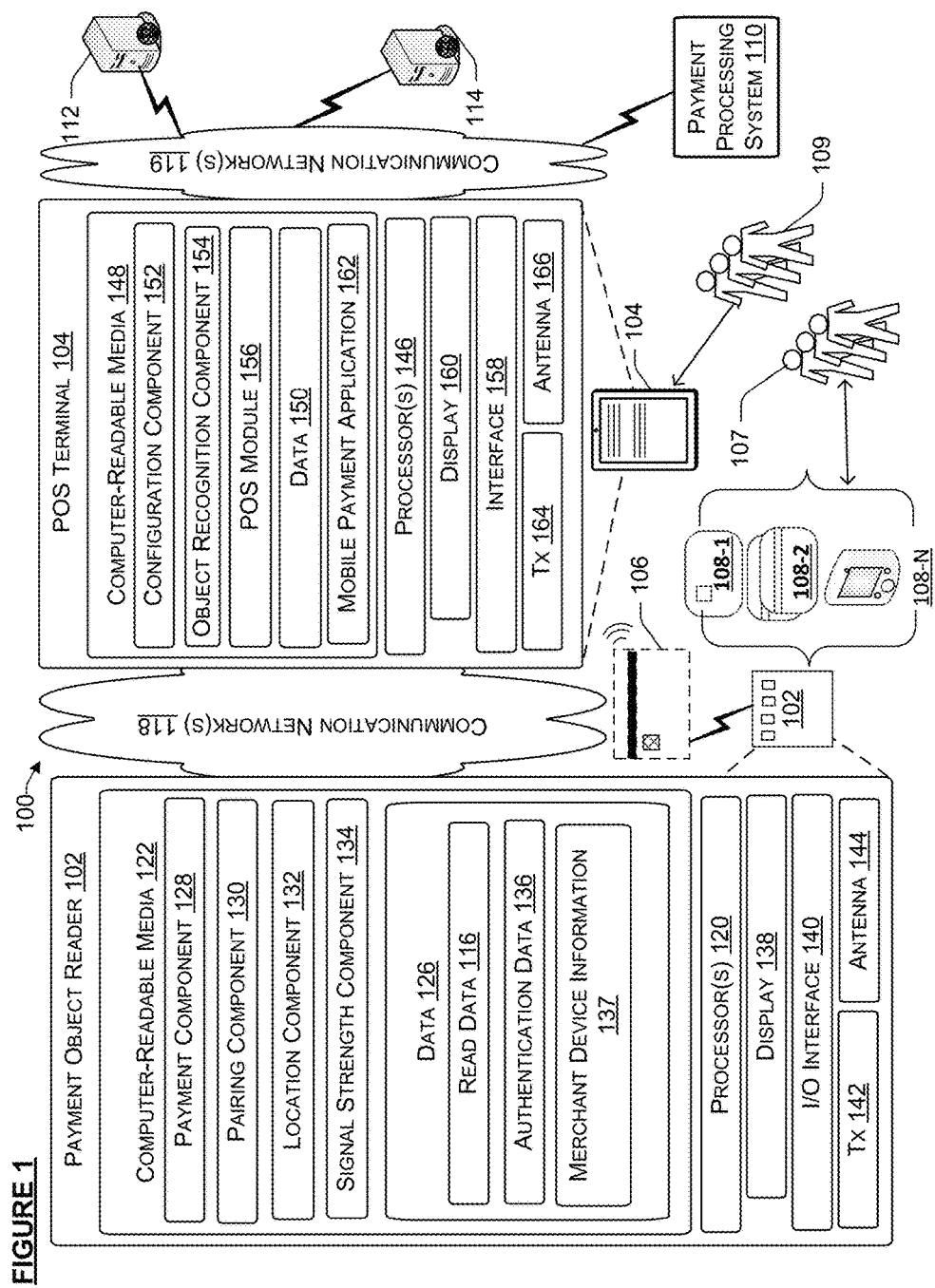

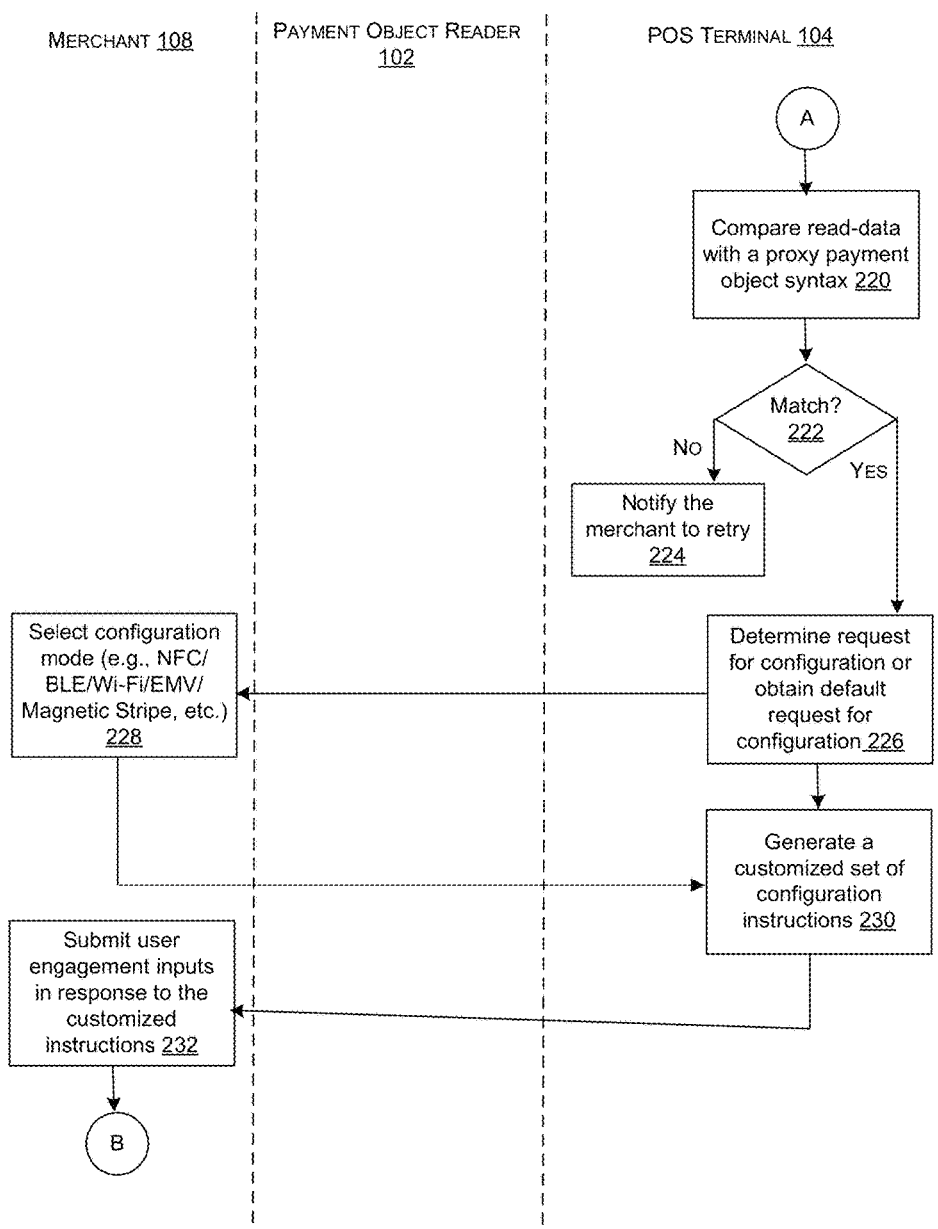

CONFIGURATION OF A PAYMENT OBJECT READER

CROSS REFERENCE TO RELATED APPLICATIONS

This application claims priority to U.S. Provisional Patent Application No. 62/187,070, filed Jun. 30, 2015, titled "Configuration of a payment object reader," the entire contents of which are incorporated herein by reference.

TECHNICAL FIELD

Customers can interact with merchants to conduct various financial payment transactions. For example, a customer can conduct a transaction with a merchant at a point-of-sale system using cash, a transaction card, or other transaction instrument. Conventional systems can include expensive and bulky financial transaction electronics, as may include a card reader for payment cards (e.g., debit or credit cards), a cash drawer, monitors, keyboards, and various other electronic devices. Some point-of-sale systems require multiple types of card readers and/or complex and bulky card-reading equipment in order to accept multiple types of payment cards.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features. Moreover, multiple instances of the same part are designated by a common prefix separated from the instance number by a dash. The drawings are not to scale.

FIG. 1 is a network environment illustrating embodiments to configure a payment object reader connected to a merchant device, e.g., a point-of-sale (POS) terminal, through implementation of a proxy payment object, according to an embodiment of the present subject matter.

FIGS. 2A, 2B, and 2C are process flows that illustrate the method of configuring the payment object reader, where configuration is triggered in response to an insertion of a proxy payment object, according to an exemplary embodiment of the present subject matter.

DETAILED DESCRIPTION

Figure 2A:
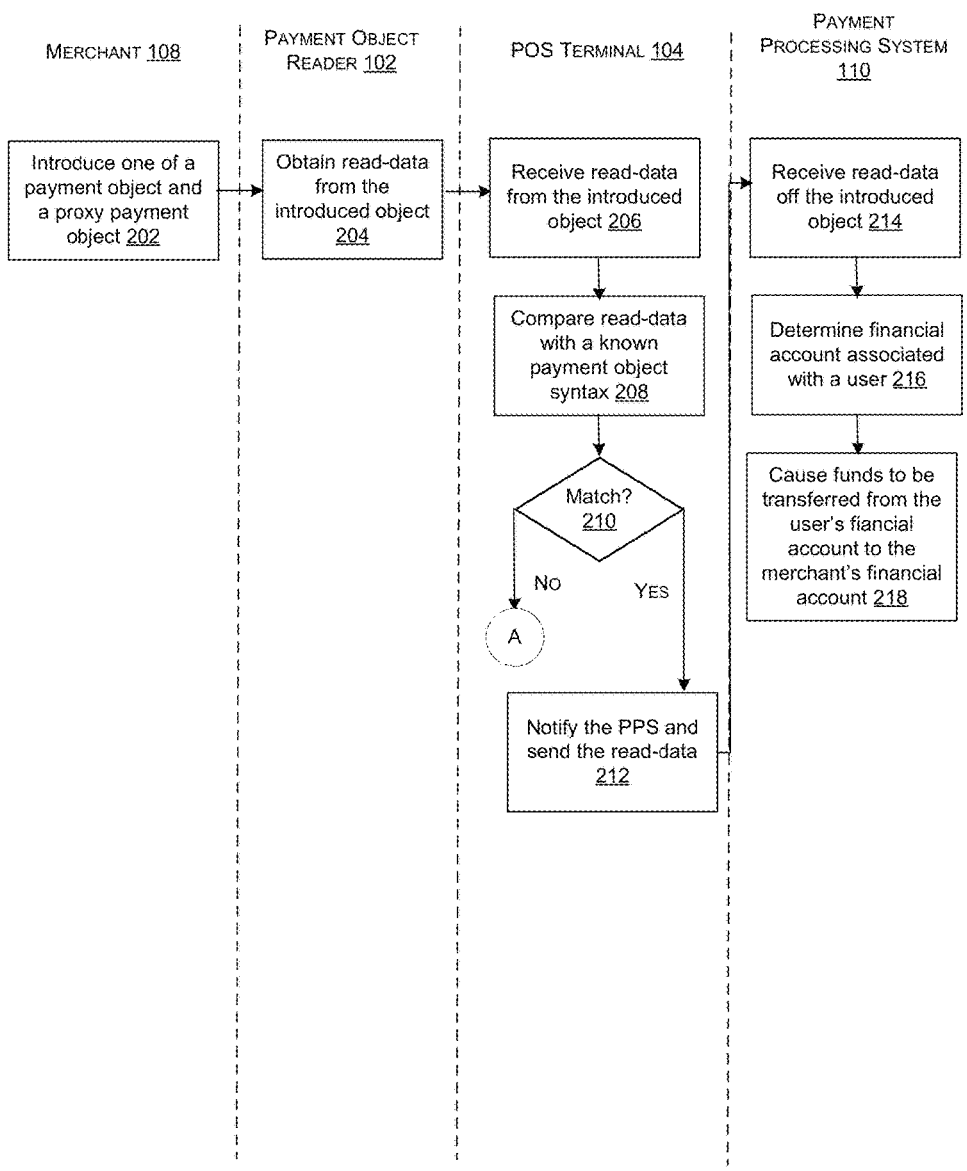

Some implementations described herein include systems, methods, apparatuses, and non-transitory media for configuration of a payment object reader. In particular, approaches provide for setting-up a payment object reader to accept one or more types of payment objects, and processing transactions after successful set-up. In one implementation, the payment object reader can interact with a point-of-sale (POS) terminal, such as a mobile phone, a laptop, a tablet, etc. As such, the configuration of the payment object reader includes configuration of the POS terminal as well.

Generally, a customer provides a payment object, such as a credit card or debit card or such financial instruments, to a merchant to process a payment transaction involving a product or service offered by the merchant. The payment object may be swiped, inserted into a slot, or tapped onto a surface of a payment object reader. The payment object may also be based on contactless technology allowing the payment object to be used by introducing the payment object within a field, e.g., a magnetic field, of or proximate to the payment object reader. The different ways to provide a payment object or to bring it in contact with another device are included in the term "introduce" or "introducing" the payment object. The payment object can also be authenticated or authorized to be used in a financial transaction by user interaction, for example by a fingerprint scan or a person identification number (PIN) entry onto a graphical user interface of the payment object reader. The financial or payment information that a payment object includes may be printed on, embedded within, or accessible via a payment card (e.g., credit card, debit card, prepaid card, etc.), a wearable device (e.g., a wearable watch), and a mobile device (e.g., a cell phone enabled with Near-Field Communication (NFC) payment technology).

Traditionally, different types of payment objects are introduced sequentially into a payment object reader; the payment object reader is then configured in various trial-and-error cycles. However, without proper instructions, it may take a number of attempts to set-up the payment object reader successfully. Furthermore, the set-up varies from one object to the other, adding to the number of trials a merchant needs to fully configure the reader, adding to the frustration of the merchant. Even if a configuration manual is provided, there may not be a real-time feedback or validation that each and every configuration step is being performed correctly. Furthermore, the merchant may not even have all foreseeable types of payment objects to try and/or fully understand the manner in which the payment object reader would work in real-time with that specific payment object. The merchant is then likely to rely on attempting to configure the reader or process the transaction using that specific payment object when presented by the customer. This may be both risky and prone to failure since a valid payment object is being used as a test card in a real payment transaction that may not be acceptable to a customer.

To this end, in one embodiment, a proxy payment object may be used to configure the payment object reader to train, configure or set-up the payment object reader to accept one or more types of payment objects. The proxy payment object is an object that is representative of several payment objects that a merchant encounters in the field. The proxy payment object may have the look-and-feel of an actual payment object, e.g., credit card, debit card, and the like. The successful configuration facilitates the payment object reader to process payment transactions in the field. The configuration of the payment object reader may also include facilitating login and registration of the payment object reader with a point-of-sale (POS) terminal, a payment processing system, or applications running thereon. The proxy payment object, in one implementation, may resemble a valid payment card and may or may not have a financial value. Furthermore, the proxy payment object may include a magnetic stripe, an EMV chip, and an NFC based chip to allow for radio communication.

In one implementation, introducing the proxy payment object into a payment object reader initializes a configuration component stored within the payment object reader. Optionally, the configuration component may be stored on the POS terminal, or even a third-party server, the configuration component made accessible through a web application. In some implementations, the configuration component may be stored on the proxy payment object itself.

In one implementation, according to the method of introduction, sensors (e.g., electrical, magnetic) read data off of the proxy payment card and temporarily or permanently store it as "read-data." Additionally or alternatively, the read-data may be compared to a predefined and stored syntax or value to determine whether it is a proxy payment card, a legitimate payment object or any other counterfeit object. The predefined syntax and/or value may be connected to an identity of the payment object reader, such as its registration number. Thus, the read-data (or in other words, the proxy payment object) can be unique to the payment object reader. In another implementation, the proxy payment object can be unique to the seller or channel distributing the payment object reader to merchants. In some cases, due to security reasons, at least a portion of the predefined syntax and/or value and the read-data may change dynamically based on merchant's preferences, such as store location, merchant's name, etc. Thus, in some cases, the read-data may be customized to be unique not just from the perspective of the payment object reader but also the merchant. The customization of read-data may be applied, for example, using the unused tracks on a magnetic stripe; one or more electrical contacts on the smart-chip, or even unused portions of the payment object.

In one implementation, a sensor or sensor arrangement associated with the payment object reader makes a first determination that a proxy payment object is inserted, for example by receiving read-data at the time when the proxy payment object is dipped into an opening of the payment object reader, swiped within the payment object reader, tapped onto a surface of the payment object reader, or hovered proximate to the payment object reader. Then, the configuration component connected to the sensor obtains read-data including the manner in which the proxy payment object was introduced in order to trigger a unique set of configuration instructions corresponding to the proxy payment object and/or manner of object introduction. For example, when the object is swiped, read-data is obtained, and/or one or more track sensors are activated. A magnetic stripe (mag-stripe) sub-component within the configuration component directed to magnetic stripe payment cards, is then initialized. The mag-stripe sub-component provides configuration instructions on a graphical user interface (GUI) of the POS terminal (that may be accessible through a mobile application stored on the POS terminal), one or more of which may require user engagement. At the end of each configuration instruction of the payment object reader, the mag-stripe sub-component generates a validation notification to indicate successful configuration, or an error notification, in case the step is not performed correctly. If incorrect, the merchant can go back and re-do the step. At the end of successful configuration of the payment object reader as per the instructions in the mag stripe sub-component, magnetic stripe payment objects can be accepted by the payment object reader.

In another example, when the proxy payment object is dipped into a slot, read-data is obtained, and/or one or more EMV electrical contacts are activated, and then an EMV sub-component within the configuration component directed to EMV payment cards, is initialized. The EMV sub-component guides the merchant to enable one or more options on the POS terminal and/or the payment object reader via the GUI or the application to configure the payment object reader to start accepting EMV payment objects.

In yet another example, when the proxy payment object is tapped onto a surface of the payment object reader or hovered overhead the payment object reader, read-data is obtained and/or one or more fields (e.g., magnetic) may change. Subsequently, a contactless payment sub-component within the configuration component directed to RFID (e.g., NFC), Bluetooth®, or Bluetooth Low Energy® (BLE) payment objects, is initialized. The contactless sub-component may further request the user (e.g., the merchant) to make selections from among NFC, BLE, Wi-Fi or any other means of communication to configure the payment object reader to accept NFC/BLE/Wi-Fi enabled payment objects. Based on the selection, the contactless sub-component generates a unique set of configuration instructions to set-up the payment object to receive payments via at least one of NFC-based proxy payment object, Bluetooth, BLE or Wi-Fi, as the case may be.

In some implementations, as an additional step of confirmation of successful configuration, the merchant may perform a test payment transaction using the proxy payment object after configuration is complete. The payment proxy object may have some financial value stored thereon to facilitate processing of test payment transactions. Once introduced in the payment object reader, the read-data from the proxy payment object is captured. The read-data is indicative of the financial or bank account of the merchant/recipient.

A payment processing system, connected to the POS terminal, receives the read-data. Optionally, the payment processing system can parse the read-data. The payment processing system communicates with a financial institution (e.g., a card issuing or an acquiring bank) to determine details of the financial value associated with the proxy payment object and process the test transaction on receiving confirmation from the financial institution. Thus, using the read-data, the merchant processes a test transaction via a web-application, a messaging application, a forum message, a third-party application, or a webpage with customized uniform resource locator (URL). The merchant can also try to introduce the proxy payment object in a different way, for example in a different slot of the payment object reader, to confirm configuration of the reader to process transactions corresponding to several types of payment objects.

In some implementations, the proxy payment object configures the payment object reader for other purposes besides accepting a specific payment object. For example, the proxy payment object registers the payment object reader with the POS terminal or the payment processing system, registers the payment object reader with an application running on the POS terminal, creates a login for the merchant or a specific employee operating the payment object reader, or changes the identification data of the payment object reader. Some implementations contemplate automatic configuration of the reader or pairing of the reader with the POS terminal in response to introduction of the proxy payment object. Such configuration can be triggered or initialized when the proxy payment object is introduced in the payment object reader, independent of the manner in which the proxy payment object is introduced.

In some embodiments, successful configuration of the payment object reader, for example, in response to obtaining a notification showing complete execution of a configuration component or its sub-components and/or processing of successful test transactions, can be incentivized with rewards. Thus, in an example, method of configuration of the payment object reader for each new type of payment object, includes associating a financial value with the configuration of proxy payment object, where the value increases as the configuration progresses.

Embodiments of the methods and systems described can be installed on a multi-functional point-of-sale system or on a beacon of data that may not have payment receiving means. As described herein, the merchant can easily and seamlessly configure the payment object reader to accept as many payment objects as possible using a single proxy payment object that is representative of several payment objects that a merchant might encounter in the field. In some embodiments, the method includes a step to provide a real-time feedback to correct errors or anomalies that may occur during the configuration, for example due to operating system update, incorrect user selections, etc. The embodiments described herein also allow the merchant to perform trial transactions without having to use their own or customer's credit card as test cards. The trial transaction, if successful, indicates successful configuration of the payment object reader to accept the type of payment object for which the payment object reader has been configured If unsuccessful, the proxy payment object can re-initialize the configuration component for error handling and/or making corrections to the initial configuration.

Certain embodiments may be configured for use in stand-alone devices (e.g., PDAs, smartphones, laptops, PCs and/or the like). Other embodiments may be adapted for use in a first device (e.g., mobile phone, and/or the like), which may be connected to a second device (e.g., tablet computer and/or the like) via any type of connection (e.g., Bluetooth, USB, Wi-Fi, serial, parallel, RF, infrared, optical and/or the like) to exchange various types of data (e.g., raw signals, processed data, recorded data/signals and/or the like). In such embodiments, all or part of the data processing may happen on the first device, in other embodiments all or part of the data processing may happen on the second device. In some embodiments there maybe more than two devices connected and performing different functions and the connection between devices and processing may happen in stages at different times on different devices. Certain embodiments may be configured to work with various types of processors (e.g., ARM, Raspberry Pi and/or the like).

It should also be appreciated by those skilled in the art that any block diagrams, steps, or sub-processes herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown. The order in which the methods are described are not intended to be construed as a limitation, and any number of the described method blocks can be deleted, moved, added, subdivided, combined, and/or modified in any order to implement the methods, or an alternative combination or sub-combinations. Also, while steps, sub-processes or blocks are at times shown as being performed in series, some steps, sub-processes or blocks can instead be performed in parallel, or can be performed at different times as will be recognized by a person of ordinary skill in the art. Further any specific numbers noted herein are only examples; alternative implementations can employ differing values or ranges. Furthermore, the methods can be implemented in any suitable hardware, software, firmware, or combination thereof.

The following description provides specific details for a thorough understanding and enabling description of these embodiments. One skilled in the relevant art will understand, however, that the embodiments discussed herein may be practiced without many of these details. Likewise, one skilled in the relevant art will also understand that the embodiments can include many other features not described in detail herein. Additionally, some well-known structures or functions may not be shown or described in detail below, so as to avoid unnecessarily obscuring the relevant description. Some of the recurring terms are now defined.

The terms "connected" or "coupled" and related terms used throughout the description are used in an operational sense and are not necessarily limited to a direct physical connection or coupling. Thus, for example, two devices may be coupled directly, or via one or more intermediary media or devices. As another example, devices may be coupled in such a way that information can be passed there-between, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," and the like generally mean the particular feature, structure, or characteristic following the phrase is included in at least one implementation of the disclosed technology, and may be included in more than one implementation. In addition, such phrases do not necessarily refer to the same embodiments or different embodiments.

The term "logging in" or "checking in" may refer to the customer's action through a user application or engagement with hardware or software features to indicate availability to conduct a payment transaction or to communication by the user device of such an indication to the POS terminal, as the context requires. In essence, checking in constitutes a consent by the user to conduct a card-less transaction with the merchant. This consent differs from actual authorization of the transaction, which the user would provide, e.g., verbally, or in a written form, upon learning the amount of the transaction.

The term "cause" and variations thereof, as used throughout this description, refers to either direct causation or indirect causation. For example, a computer system can "cause" an action by sending a message to a second computer system that commands, requests or prompts the second computer system to perform the action. Any number of intermediary devices may examine and/or relay the message during this process. In this regard, a device can "cause" an action even though it may not be known to the device whether the action will ultimately be executed or completed.

The term "component," "component" or "engine" refers broadly to general or specific-purpose hardware, software, or firmware (or any combination thereof) components. Components and engines are typically functional components that can generate useful data or other output using specified input(s). A component or engine may or may not be self-contained. Depending upon implementation-specific or other considerations, the components or engines may be centralized or functionally distributed. An application program (also called an "application") may include one or more components and/or engines, or a component and/or engine can include one or more application programs.

Furthermore, for the purposes of interpreting this specification, the use of "or" herein means "and/or" unless stated otherwise. The use of "a" or "an" herein means "one or more" unless stated otherwise. The use of "comprise," "comprises," "comprising," "include," "includes," and "including" are interchangeable and not intended to be limiting. Also, unless otherwise stated, the use of the terms such as "first," "second," "third," "upper," "lower," and the like do not denote any spatial, sequential, or hierarchical order or importance, but are used to distinguish one element from another. It is to be appreciated that the use of the terms "and/or" and "at least one of", for example, in the cases of "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

While certain devices, e.g., the payment object readers and POS terminals, are shown as including distinct components, this is merely for ease of illustration and not intended as limiting. In various implementations, the payment object readers and POS terminals may be identical, similar or distinct. Moreover, the components shown and described for the payment object readers and POS terminals may be implemented as more components or as fewer components and functions described for the components may be redistributed depending on the details of the implementation. Additionally, in some implementation, there may be several, hundreds, thousands, hundreds of thousands, or more, of the payment object readers and the POS terminals. Further, in some implementations, configuration, structure, and operational characteristics of the payment object readers and/or POS terminals may vary from device to device. In general, payment object readers and the POS terminals can each be any appropriate device operable to send and receive data, requests, messages, electronic messages, text messages, alerts, notifications, pop-up messages, push notifications, or other types of information over the one or more networks or directly to each other.

The automated and seamless configuration technology introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to cause one or more processors to perform the methods, variations of the methods, and other operations described here. The machine-readable medium may include, but is not limited to, floppy diskettes, optical discs, compact disc read-only memories (CD-ROMs), magneto-optical discs, read-only memories (ROMs), random access memories (RAMs), erasable programmable read-only memories (EPROMs), electrically erasable programmable read-only memories (EEPROMs), application-specific integrated circuits (ASICs), magnetic or optical cards, flash memory, or other type of media/machine-readable medium suitable for storing electronic instructions. Various embodiments will now be described in further detail with the help of one or more figures.

The preceding summary is provided for the purposes of summarizing some exemplary embodiments to provide a basic understanding of aspects of the subject matter described herein. Accordingly, the above-described features are merely examples and should not be construed as limiting in any way. Other features, aspects, and advantages of the subject matter described herein will become apparent from the following description of Figures and Claims.

Turning now to the Figures, FIG. 1 is a network environment 100 illustrating embodiments to configure a payment object reader 102 connected to a merchant device, e.g., a point-of-sale (POS) terminal 104, to accept a variety of payment objects 108 through implementation of a proxy payment object 106, according to an embodiment of the present subject matter. In one implementation, the proxy payment object 106 is representative of any number of payment objects. The POS terminal 104 can be, for example, a desktop computer, a hand-held device, a network computer, a laptop, tablet or other portable computer, a mobile phone, a landline phone, or any other form of processing device.

In one implementation, the payment object reader 102 once configured by the proxy payment object 106 can accept one or more payment objects 108 (such as payment object 108-1, 108-2, . . . 108-N) presented by a customer 107 towards a payment transaction for a product and service. The transaction is then processed and fulfilled via the POS terminal 104, the payment processing system 110, and the financial network systems 112 and 114. The POS terminal 104 and the payment object reader 102 are together referred to as the POS system hereinafter.

In one implementation, the network environment 100 includes: a user or a customer 107 associated with a payment object 108 (and optionally, a user device); a merchant device(s), such as a POS terminal 104, belonging to a merchant 109; one or more payment object readers 102; a payment processing system 110 ("PPS 110"); one or more bank computing device(s) 114; and a card payment network computing device(s) 116; all of which are connected via a communications network(s) 118 and 119. The bi-directional lines from the user 107 to the payment object reader 102 is intended to depict interaction of the user 107 with the payment object reader 102 via the payment object 108. For example, the interaction of the user 107 may be in the form of card swipe or card insertion into the payment object reader 102. The merchant 109 also interacts with the payment object reader 102 in the same way. Furthermore, while the payment card reader 102 may be shown to be external to the POS terminal 104, in some implementations, the payment object reader 102 may be a component within the POS terminal 104 or directly connected to the POS terminal 104, for example through a universal serial bus (USB) connection or inserted into the audio jack of the POS terminal 104. Alternatively, the payment object reader 102 may communicate with the POS terminal 104 through the communication network 118, or similar network.

"Proxy payment object 106" and "Payment object 108" (collectively referred to as object) refers to a payment mechanism that includes a debit card, a credit card, a prepaid gift card, or the like, a smartcard that has an embedded integrated circuit chip (e.g., Europay-MasterCard-visa (EMV) card), an alias card, or any card that functions as a combination of any of these mechanisms. The term "alias card" as used herein refers to a card that may or may not bear a card number/account number that appears to be that of a real credit or debit card account (i.e., it is in the correct format), but where that card/account number is actually only a placeholder for the customer's real card/account number. Another type of proxy payment object 106 and payment object 108 is a biometrically identifiable instrument, which may be initialized using a biometric characteristic such as a person's finger (e.g., for fingerprint recognition), face, iris or retina, heartbeat, voice spectrum, etc. Alternatively, proxy payment object 106 or payment object 108 can be a software instrument or virtual instrument, such as a virtual wallet configured to initiate contactless payment transactions, e.g., a key fob, a mobile device having an RFID tag, etc. Other examples of proxy payment object 106 and/or payment object 108 may also include a prepaid card, a gift card, a rewards card, a loyalty points card, a frequent flyer miles card, checks, cash, or in general, any kind of financial instrument that holds financial value or provides a promise to pay at a later time. In some cases, the proxy payment object 106 is representative of the payment object 108. The proxy payment object 106 may have the look-and-feel of a payment object 108 but is operationally, adapted to be capable of configuring the payment object reader 102 and/or the POS terminal 104. For example, the proxy payment object 106 is a replica of an actual electronic credit card (i.e., a faux bankcard), which serves as a vehicle for configuration. The card may be plastic or paper-based, may have embossing or a magnetic stripe thereon.

In some implementations, both the proxy payment object 106 and the payment object 108 can be connected to a financial account and may thus hold a financial value enabling the user to purchase a product or service with it. Furthermore, the proxy payment object 106 can have a unique number imprinted thereon tied to the financial account. This financial information can be embedded or linked to the unique number or a string of alphanumeric characters, hereinafter referred to as read-data 116, and stored as digital data in the magnetic stripe, NFC or EMV chip, etc. The read-data of the payment object 108 may be in a syntax ("payment object syntax") prescribed by the acquirer 112 or issuer 114 of the payment object 108. For example, by analyzing the read-data 116 and confirming that it matches the payment object syntax, the POS terminal 104 via the PPS 110 may determine whether inserted object is a payment object 108 and whether the payment object 108 is issued by Visa®, Amex®, Discover® or MasterCard®, and so on. Accordingly, the payment object reader 102 may process the transaction by accessing funds connected to the account of payment object 108.

Alternatively, the read-data 116 of the proxy payment object 106 may be in a syntax/format ("proxy payment object syntax"), which, in one implementation, may be different from the payment object syntax. In some implementations, however, the syntax may be the same but a portion of the payment object syntax may be reserved to identify proxy payment objects 106. By analyzing the read-data 116 in the proxy payment object syntax, the POS terminal 104 via the PPS 110 may determine whether the inserted object is a proxy payment object 106. Accordingly, the POS terminal 104 and/or PPS 110 can use the read-data 116 off the proxy payment object 106 to trigger a configuration, login or registration mode of the payment object reader 102. As used herein, the configuration mode refers to configuring or training the payment object reader to accept payment from one or more kind of payment objects. The registration mode refers to setting up a login account, for example, a checking or login account for an application connected to the POS terminal 104. The proxy payment object 106 may include a smart chip to generate a dynamic payment proxy based on a changing parameter, such as user profile, time of day, location, etc., through network connection established by the payment object reader 102. This may be helpful to customize the payment object reader 102 for a merchant 109 or give only a specific person the rights to configure or reset the payment object reader 102.

The proxy payment object 106 and the payment object 108 can be swiped within a slot of the payment object carder 102 (for example, for magnetic stripe-type cards), inserted into an opening to contact a proxy payment object 106 and/or a payment object 108 (for example for EMV or chip-type payment cards) or placed proximate the payment object reader 102, by a "tap" or "hover" proximate the payment object reader 102 in some embodiments (for example, using a near field communication (NFC) component). The payment object reader 102 can, in some embodiments, have a communication component (not shown) instead of, or in addition to, the audio plug, for communicating wirelessly (e.g., Bluetooth, BLE, Wi-Fi, etc.) to the POS terminal 104, mobile device or any other computing device. Any manner of triggering the payment object reader 102 to read data off a proxy payment object 106 and/or a payment object 108, such as by dipping into, tapping, hovering, bringing in close contact or passing the proxy payment object 106 or payment object 108 into or through a payment object reader 102, is hereinafter referred to as "introduce" or "introducing" the payment object 108 or proxy payment object 106.

In one implementation, the payment object reader 102 may be a magnetic stripe card reader, optical scanner, smartcard (card with an embedded IC chip) reader (e.g., an EMV-compliant card reader or NFC enabled reader), radio frequency identification (RFID) reader, or the like, configured to detect and obtain payment transaction data off a payment object 108. Accordingly, the payment object reader 102 may include hardware features, such as slots, magnetic tracks, and rails with one or more sensors or electrical contacts to facilitate detection and acceptance of a payment object 108 or proxy payment object 106.

In one implementation, the payment object reader 102 may also include a processor 120, computer readable media 122 having one or more components and database 126. The components include programs that supplement applications or functions performed by the payment object reader 102, database 126, random access memory (RAM), read only memory (ROM), etc., (not shown for simplicity) into which data may be saved that serves, amongst other things, as repository for storing data pertinent to functioning of the components. The computer-readable media 122 may store a payment component 128, a pairing component 130, a location component 132, and a signal strength component 134. In one implementation, the payment component 128 detects and obtains payment information from a payment object 106 or a proxy payment object 108 introduced in the payment object reader 102. The payment component 128 when connected with another device, can also transmit the read-data 116 to requesting devices. The pairing component 130 controls and modifies the public authentication data 136 in order to pair the payment object reader with any peripheral device, including merchant device 104. The display control component (not shown) provides various functionalities for accessibility, such as vibrating, sounding, lighting a visual indicator, e.g., light emitting diode (LED), or displaying other lights, color, or animation on a screen display 138 to communicate a specific digit or value of a digit, or even operational status of the payment transaction or device. The location component 132 can determine the location coordinates of the payment object reader 102 at any time and relay such information to neighboring devices, for example, in response to a request. The location component 132 can also determine the distance between the payment object reader 102 and any other peripheral device including the merchant device 104. The signal strength component 134 determines the network connectivity strength of devices around the payment object reader 102 by receiving and comparing signals emitted by external devices. Data may include tables to store read-data 116, authentication data 136, and merchant device information 137. The payment object reader 102 may also include input-output interface 140 having magnetic, electrical or other such contacts to detect and receive a payment object 108 or a proxy payment object 106 and reject counterfeit objects. This is further explained with reference to FIGS. 3A and 3B. The payment object reader 102 also includes a transceiver 142 and antenna 144 to communicate with GPS units and wireless, radio-frequency, USB or infrared, Bluetooth Low Energy, or Bluetooth enabled devices or objects.

Similar to the payment object reader 102, the POS terminal 104 may also include a processor 146, computer readable media 148 having one or more components and data 150. The components can include programs that supplement applications or functions performed by the POS terminal 104, database 150, random access memory (RAM), read only memory (ROM), etc., into which data may be saved that serves, amongst other things, as repository for storing data pertinent to functioning of the components.

In one implementation, the computer readable media 148 may include a collection of components such as, but not limited to: the configuration component 152; the object recognition component 154; and/or POS component 156 (i.e., collectively a component collection). The object recognition component 154 is configured to receive read-data 116 from the payment object reader 102 and compare to sample values or templates or a syntax "a payment object syntax" to determine whether the introduced object is a payment object 108 or a proxy payment object 106. For example, the object recognition component 154 implements, through a variety of sensors (magnetic sensors, UV rays based, Infrared sensors, cameras, etc.), recognition methods to differentiate the proxy payment object 106 from other objects, including payment object 108 and counterfeit objects. The recognition can be based on, but not limited to, a size, thickness, weight, width, a fingerprint, a pattern, image characteristics, and an anti-counterfeiting character, such as a hologram or an engraving or a watermark, on the proxy payment object 106. The recognition methods include, but are not limited to, method based on support-vector machine, feature vector selection method, Near infrared spectroscopy method, multiple linear regression method, and clustering method.

Thus, depending on whether or not the object recognition component 154 detects a proxy payment object 106 (and the nature or mode of introduction of the object 106), the POS terminal 104 chooses a process flow. For example, on determining, based on the read-data 116, that the object is a proxy payment object 106, configuration of the payment object reader 102 may be initialized through the configuration component 152. The configuration component 152 can configure the payment object reader 102 to accept one or more payment objects 106 based at least on a configuration mode input: a user engagement input defining the type or mode of configuration; analysis of the read-data 116 that also shows the manner in which the object was introduced; and/or intent to configure established based on insertion of a payment proxy object 106. For example, the configuration mode input may be in the form of a request for configuration of the payment object reader 102 to accept at least one of chip-and-pin cards, magnetic stripe cards, or NFC based credit cards. Another example of configuration mode input may be in the form of a request for creation of a login account for the merchant 109 or register the payment object reader 102 with the PPS 110. Based on the type of payment object that is desired to be accepted, the configuration component 152 may include and enable, when needed, one or more sub-components, e.g., contactless configuration sub-component, mag-stripe configuration sub-component, EMV configuration sub-component, and/or like, customized to configure the payment object reader 102 to accept contactless/NFC, magnetic stripe and EMV-based payment objects 106, respectively. Each of the sub-components generates a set of instructions relevant to configuration the payment object reader 102. The instructions may also be customized based on the read-data 116, the distribution channel or merchant 109. Such instructions may also be retrieved from the payment processing system 110 or any such web or application server (not shown). The instructions when executed, either by the POS terminal 104 and/or the merchant 109, changes the hardware or software settings of the payment object reader 102 to accept and exchange data over any technology, such as BLE, Bluetooth, NFC, or QR technologies. This is made possible based on the configuration and training facilitated by the a single object, such as proxy payment object 104, thus reducing errors associated with trial attempts made by the merchants 108 to set-up the payment object reader 102 with their payment objects 108 or customer's payments objects 108. The configuration component 152 can establish communication links or connect essential components between the payment object reader 102 and the proxy payment object 104 with or without user engagement. Furthermore, the proxy payment object 106 triggers automatic registration and login using data obtained at the time of purchase of the payment object reader 102. After configuration, the payment object reader 102 can communicate with payment objects 108 and process transactions involving payment objects 108.

In one implementation, the POS component 156 facilitates processing of test transactions to confirm proper configuration of the payment object reader 102. The proxy payment object 106 when inserted causes the POS component 156 to communicate with a back end processor (e.g., PPS 110). Due to the nature of the object introduced in the payment object reader 102 as derived from the read-data 116, the PPS 110 tags the purchase as trial purchase and turns the proxy debit card from an inactive card file to an active card file. The payment proxy object 106 may be preloaded with a certain financial value that the merchant 109 can use towards a test transaction. The merchant 109 can also add additional funds to the proxy payment object 106 up to a predetermined limit, for example, $500. Thereafter, the merchant 109 receives a receipt for the transaction, and is able to utilize the funds at networks that are enabled to receive the proxy payment object 106.

Once the test transactions have been successfully performed, the POS component 156 allows and enables the POS terminal 104 to connect with the payment object reader 102 to receive read-data 116, e.g., from a real payment object 108 and then processes or transfers the transaction data to an external server, such as a PPS 110, card payment computing device 114, and a bank computing device 112, to obtain financial account information of users to fulfill a transaction. The POS component 156 may allow and enable the payment object reader 102 to map the transaction data associated with the object with a financial account. There may also be additional components that can enable and allow processing of data/signals required by the payment object reader 102. The structure and/or operation of any of the payment object reader 102 components may be combined, consolidated, and/or distributed in any number of ways to facilitate development and/or deployment.

In one embodiment, the data 150 includes several data tables. The transaction data includes fields such as, but not limited to, transaction information, purchases made, purchase history, price of the product, and/or the like. The payment object syntax data includes fields such as, but not limited to: financial account, payment card issuer, payment card data, payment card CVV, payment card format, payment card last used, etc. The proxy payment object syntax data table includes fields such as, but not limited to: payment proxy, payment proxy financial account, payment proxy last used, payment proxy transaction history, payment proxy contact list, and/or the like. The payment proxy data table may receive, send and/or track incoming and outgoing payment proxies. In one embodiment, specific tables may be created when each of the components are executed. Furthermore, the tables may be stored temporarily or permanently in the database 150, or even in a remote database.

The payment object reader 102 can also be equipped with interface(s) 158 (e.g., input-output interface and network interfaces) to accept payment via Wi-Fi, NFC, BLE, Bluetooth, magnetic stripe or EMV-chip based payment objects 108.

The Input-Output interfaces (I/O) may allow for the display, execution, interaction, manipulation, and/or operation of program components and/or system facilities through textual and/or graphical facilities through one or more interaction interface elements, such as check boxes, cursors, menus, scrollers, and windows to facilitate the access, capabilities, operation, and display of data and computer hardware and operating system resources, and status. Graphical user interfaces (GUIs) may be used to provide a baseline and means of accessing and displaying information graphically to users on display 160. The display 160 may be driven by a mobile payment application 162 that also displays the instructions generated by the configuration component 152. The display 160 can allow the merchant 109 or the user 107 to interact by providing visual, audio or haptic input. The mobile payment application may also generate notifications or alerts in cases where an instruction is not properly followed, or to report errors.

In various embodiments, the network interface(s) can support wireless data transfers between the portable object reader and payment object by using wireless protocols, such as Wi-Fi (e.g. IEEE 802.11a/b/g/n, Wi-Max), Bluetooth or Bluetooth low energy (BLE), infrared, and the like. Examples of the interface(s) can be BLE interface, Wi-Fi interface, QR interface, NFC interface, EMV interface, cellular technology interface, and other interface(s). To this end, a transceiver 164 and antenna 166 is also included.

The networks 118 and 119 can include any combination of local area and/or wide area networks, using both wired and wireless communication systems. In some embodiments, the network 104 uses standard communications technologies and/or protocols. Thus, the network 104 can include links using technologies such as Ethernet, 802.11, a Wi-Fi, a Bluetooth network; and/or the like worldwide interoperability for microwave access (Wi-MAX), 3G, 4G, CDMA, digital subscriber line (DSL), etc. The communication network may also be a mesh network. For example, in a wireless local area network (WLAN), network devices may be configured to receive and forward communications which are ultimately destined for a different device. These types of networks are generically referred to as "mesh" networks, where network nodes may form a "mesh" of paths for which communications may travel to reach their destination.

The description hereinafter shows the payment object reader 102 to have the processing capabilities and intelligence to accept payment objects when configured and process transactions. In some implementations, the POS terminal 104 may have similar or same components as the payment object reader 102 and the payment object reader 102 may serve as a reader and transmitter of transaction data read off the payment object 106. In some other implementations, both the payment object reader 102 and the POS terminal 104 may have processing and intelligence to accept one or more payment objects and process any transactions.

Figure 2C:
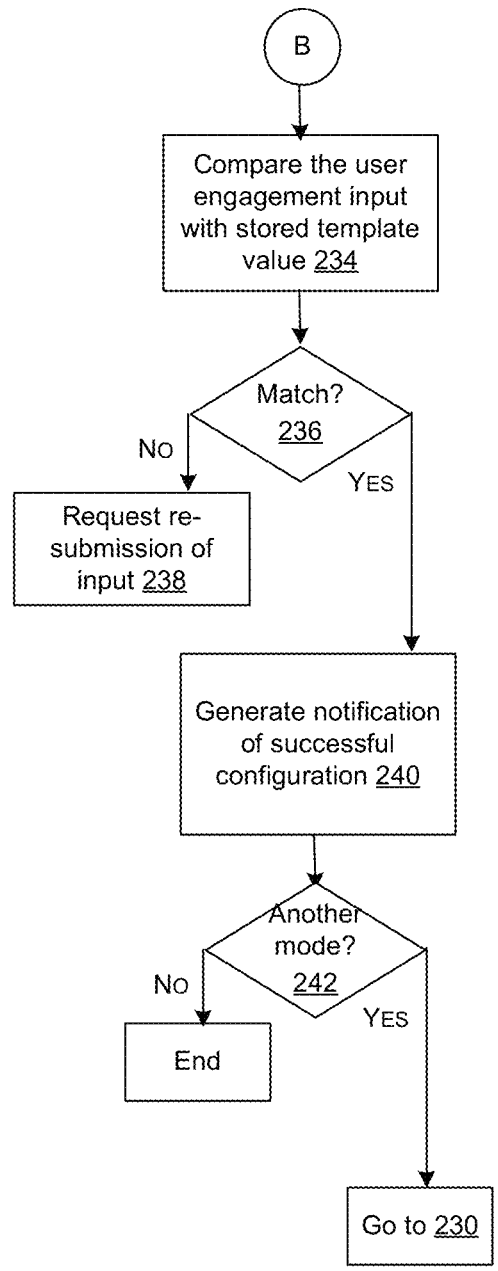

FIGS. 2A, 2B and 2C are process flows that illustrate the method(s) of configuring a payment object reader 102, where configuration is triggered in response to an introduction of a proxy payment object 106 in the payment object reader 102, according to an exemplary embodiment of the present subject matter. Initially, a merchant 109 introduces an object, for example a payment object 108 or a proxy payment object 106 into the payment object reader 102, for example, by tapping the object onto the surface of the payment object reader 102. Optionally or additionally, the merchant 109 may connect the payment object reader 102 with the POS terminal 104 via for example, USB/Wi-Fi connection (step 202). As the object is introduced (e.g., swiped, inserted, or tapped) in the payment object reader 102, read-data 116 can be obtained off the object. The read-data 116 may also include data pertaining to the manner, for example, inserted, dipped, swiped, tapped, etc., in which the object was introduced in the payment object reader (step 204). In one implementation, the read-data 116 may be transmitted to the POS terminal 104 via the USB/Wi-Fi connection (step 206). The POS terminal 104 then compares the read-data 116 with a known payment object syntax to determine whether or not read-data 116 corresponds to a payment object 108 (step 208).

If the match operation (step 210) as a result of the comparison at step 208 yields a "Yes," the flow transitions to steps 212-218. The payment object reader 102 sends the received read-data 116 to a payment processing system (PPS) (step 212). The PPS 110 receives the read-data 116 (step 214), deconstructs or analyzes the read-data 116 to determine identifier information of the sender or user 107, and optionally, the merchant 109. A financial account connected to the user 107 is identified based on the identifier information of the user 107 (step 216). In response to identification of the user's financial account, the PPS 110 through the acquirer 112 and issuer 114 computing systems, causes the funds to be transferred from the user's financial account to the merchant's financial account (step 218).

If the match operation at step 210, however, yields a "No," the POS terminal 104 compares the read-data with a proxy payment object syntax to determine whether or not read-data 116 corresponds to the proxy payment object 106 (step 220 in FIG. 2B). In some implementations, the determination of whether the read-data 116 corresponds to a payment object 108 or proxy payment object 106 may be performed contemporaneously, for example at step 208. The comparison is used to determine whether or not there is a match (step 222). If "No," the merchant is notified to retry with another object (step 224). However, if the read-data 116 matches with the proxy payment object syntax, the POS terminal 104 obtains the request for configuration (step 226). For example, the merchant 109 may wish to configure the payment object reader to accept contactless payments, EMV payments, or magnetic stripe payments. For this, the merchant may select the configuration mode through a graphical user interface presented on a merchant device (step 228). Based on the selection or default selection, a customized set of real-time instructions is generated by the POS terminal 104. The customized set of real-time instructions may facilitate the merchant to configure the payment object reader to accept a specific type of payment object 108 (step 230). For example, the POS terminal 104 presents real-time and customized instructions, such as, "press a button located at the bottom of the reader," "turn the device off for five seconds" "register your bank account at this time," "move the device an inch closer to the terminal," "do you need additional assistance?" "connecting to a support representative," "your bank has approved registration," and so on.

To this end, the merchant 109 submits user engagement input in response to each of the configuration instructions while the POS terminal waits (step 232), which is compared to stored template values (step 234 in FIG. 2C). In some implementations, the user engagement input may include physically moving the payment object reader 102 closer to or further away from the merchant device 104. Other examples of user engagement input include providing authentication or security keys as a visual, audio or haptic input.

If there is no match (step 236), the merchant 109 is requested to re-submit a user engagement input (step 238). At this time, the POS terminal 104 checks to see if the entered input matches with the stored template value, and if there is a match, a notification of successful configuration is generated at the POS terminal 104 (step 240). At step 242, it is determined whether there is another type of payment object 106 that needs to be configured. If yes, the flow transitions to step 230. If no, the process ends by generating a notification of successful configuration. The merchant 109 may then accept payment objects 108 from customers 107 to process transactions using the payment object 108 for which the payment object reader 102 is configured. The instructions provide the merchant 109 with an intuitive and seamless experience for setting up a new reader. Since the POS terminal 104 detects engagement and issues resulting thereof in real-time, the revised instructions, resulting from the merchant following the instructions incorrectly, are sophisticated and on point.

It should also be appreciated by those skilled in the art that any block diagrams, steps, or sub-processes herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown. The order in which the methods are described are not intended to be construed as a limitation, and any number of the described method blocks can be deleted, moved, added, subdivided, combined, and/or modified in any order to implement the methods, or an alternative combination or sub-combinations. Also, while steps, sub-processes or blocks are at times shown as being performed in series, some steps, sub-processes or blocks can instead be performed in parallel, or can be performed at different times as will be recognized by a person of ordinary skill in the art. Further any specific numbers noted herein are only examples; alternative implementations can employ differing values or ranges. Furthermore, the methods can be implemented in any suitable hardware, software, firmware, or combination thereof.

Figure 3A:
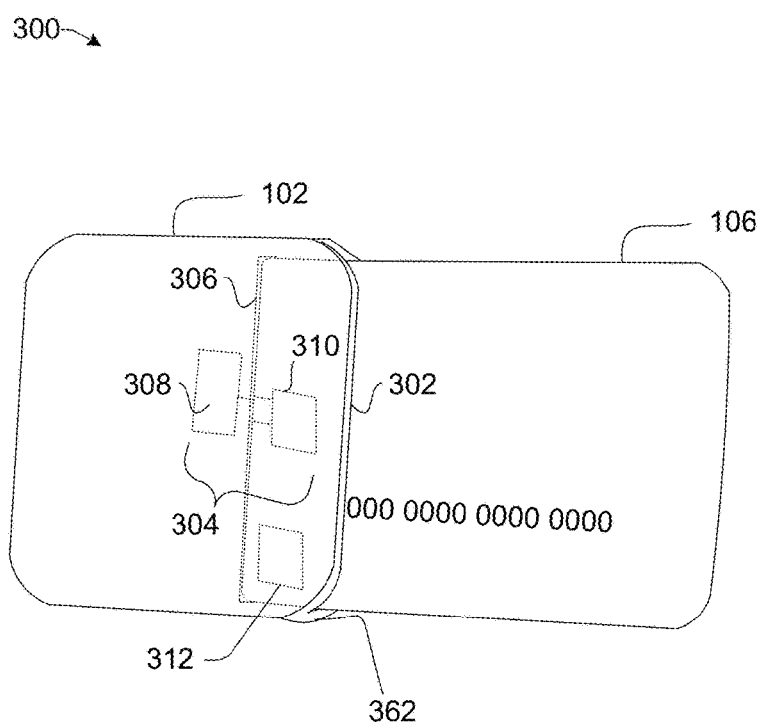
FIG. 3A is an example perspective view of a payment object reader with a proxy payment object having a smart chip card being inserted in a slot of a chip payment object reader interface, according to an exemplary embodiment of the present subject matter.
Figure 3B:
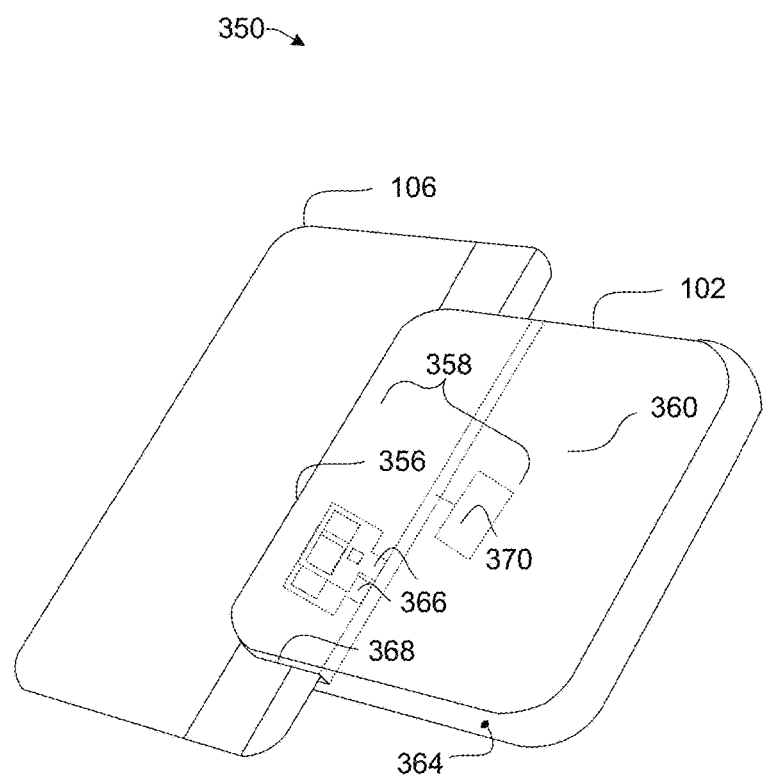
FIG. 3B is an example perspective view of a payment object reader with a magnetic stripe card being swiped within a groove of a magnetic stripe reader interface that is at the same side as the chip payment object reader interface, according to an exemplary embodiment of the present subject matter.

FIG. 3A is an example perspective view 300 of a wireless payment object reader 102 with a proxy payment object having a smart chip card 106 being inserted in a slot 302 of a chip payment object reader interface 304. FIG. 3B is an example perspective view 350 of a payment object reader 102 with a magnetic stripe card 106 being swiped at a groove 356 of a magnetic stripe reader interface 358 that is at the same side as the chip payment object reader interface 304. While not shown, the payment object reader 102 can be configured with hardware and software features to accept contactless payments, e.g., through radio communication using NFC enabled payment objects. For example, the proxy payment object 104 having NFC capabilities configures the payment object reader 102 to accept contactless payments. In one implementation, the proxy payment object has a smart chip-card, a magnetic stripe, and NFC chip.

The wireless or wired payment object reader 102 can have a frame that is configured to receive card insertions or card swipes. The frame can include a top surface 360, side surfaces 362, and a bottom surface 364. In the implementations shown in FIGS. 3A and 3B, the payment object reader 102 has a frame that is shaped as a thin parallelepiped, e.g., the width of the frame (along the top surface 360) is at least five or ten times the height (along the side surfaces 362). The top surface and bottom surface can be generally shaped as a square or rectangle, e.g., a square or rectangle with rounded edges.

The side surfaces 362 can include one or more openings that receive cards through, respectively, one or more card interfaces. The one or more card interfaces include circuitry, e.g., chip payment object reader circuitry 308 or magnetic stripe reader circuitry 358, configured to read data stored on the proxy payment object or the payment object. In some implementations, the payment object reader 102 has two openings on same or opposite sides of the frame, and a card interface within each opening. In some implementations, the payment object reader 102 has a single opening with one of the EMV or magnetic stripe interface, or both in a same opening. This is depicted in FIGS. 3A and 3B.

The payment object reader 102 can include circuitry configured to direct signals from the one or more card interfaces, to communicate wirelessly with a computing device, and to efficiently power the payment object reader 102. The one or more card interfaces of the payment object reader 102 can include a chip payment object reader interface 304, a magnetic stripe reader interface 358, and a contactless interface (not shown). In some implementations, the interfaces are on same side of the payment object reader 102 as shown in FIGS. 3A and 3B. In particular, the payment object reader 102 can include both a groove 356 and a slot 302 on the same side of the frame, but along different planes. The groove 356 can extend across the entire width of the frame, and can be configured to receive a swipe of a magnetic stripe card. The magnetic stripe reader interface 358, including magnetic read heads 366 positioned to read the magnetic information on the stripe of the card as it is being swiped, are positioned in the groove 356. The slot 302 can extend across part, but not all of the width of the frame, leaving one or more thin side walls 306 to constrain the lateral position of a chip card as it is inserted into the slot 302. The chip payment object reader interface 304, including electrical contacts 310 positioned to electrically engage the contacts on the chip card when it is inserted, are positioned in the slot 302. In one implementation, the slot 302 can be located in a plane above the plane of the groove 356. In alternative implementations, the interfaces share an opening for receiving smart chip cards and magnetic stripe cards.

In some implementations, the chip payment object reader interface 304 is configured to receive an external adapter through the electrical contacts 310. The external adapter can provide power to recharge the wireless payment object reader 102, e.g., by engaging the electrical contacts 310. The external adapter can connect the chip payment object reader interface 304 to a USB port or power supply. The external adapter can also provide software updates to the payment object reader 102.

In some implementations, sensors 312 and/or read-circuitry (e.g., magnetic sensors, UV sensors, IR sensors, pattern recognition sensors) differentiate the proxy payment object 102 from other objects. The sensors capture data and compare to stored data and apply recognition algorithms on one or a combination of visible and embedded characteristics, such as dimensions, width, texture, patterns, holograms, embedded data, and anti-counterfeiting characteristics.

In one implementation, the payment object reader 102 that is designed to receive a payment object 108 can be designed to receive the proxy payment object. The proxy payment object 106, as mentioned before, can include a chip card, an NFC card, a magnetic stripe, and in general, any feature that facilitates acceptance of any kind of payment object. When the proxy payment object is swiped, dipped, or otherwise introduced in the payment object reader 102, the read-data from the read circuitry is obtained off of the proxy payment object 106. The read-data can be in a format different from the read-data off the payment object 108. In some implementations, a portion of the read-data (e.g., the first or last four bits) may be reserved to differentiate a payment object from a proxy payment object. For example, read-data starting or ending with 1234 may indicate a proxy payment object, while read-data starting with 4121 or 4147 may indicate a VISA payment object. Furthermore, another bit of information may be used to indicate the manner in which the proxy payment object was introduced. For example, a fifth bit out of 16 bits may be used to indicate the manner of introduction. So, 1 may indicate swipe, 2 may indicate EMV dip, 3 may indicate tap, and so on. Any kind of alphanumeric digits may be used. In another implementation, the circuitry receiving the proxy payment objects may store or transmit the data, thus inherently providing information as to the manner of introduction. The read-data unique to the proxy payment object, and when compared to stored templates, triggers a configuration component in the POS terminal 104 (not shown). The configuration component trains the payment object reader 102, the POS terminal 104, and the merchant 109 to accept one or more types of payment objects. The configuration component generates a list of instructions which when executed set-up the devices to accept payment objects and process transactions. Thus, if the read-data matches with the payment object syntax corresponding to a chip card, the instructions on a GUI relate to configuration of the payment object reader to receive the chip card. In another case, if the read-data matches with the payment object syntax corresponding to an NFC card, the instructions on a GUI relate to configuration of the payment object reader to receive an NFC payment. In yet another case, if the read-data matches with the payment object syntax corresponding to a Bluetooth set-up, the instructions on a GUI relate to configuration of the payment object reader to enable Bluetooth on all relevant devices.

Unless contrary to physical possibility, it is envisioned that (i) the methods/steps described above may be performed in any sequence and/or in any combination, and that (ii) the components of respective embodiments may be combined in any manner. Note that any and all of the embodiments described above can be combined with each other, except to the extent that it may be stated otherwise above or to the extent that any such embodiments might be mutually exclusive in function and/or structure.

Although the present subject matter has been described with reference to specific exemplary embodiments, it will be recognized that the subject matter is not limited to the embodiments described, but can be practiced with modification and alteration within the spirit and scope of the appended claims. Accordingly, the specification and drawings are to be regarded in an illustrative sense rather than a restrictive sense. It will thus be appreciated that those skilled in the art will be able to devise various arrangements that, although not explicitly described or shown herein, embody the principles of the present subject matter. Furthermore, all examples recited herein are intended to be for illustrative purposes only to aid the reader in understanding the principles of the present subject matter and the concepts contributed by the inventor(s) to furthering the art, and are to be construed as being without limitation to such specifically recited examples and conditions. Moreover, all statements herein reciting principles, aspects, and embodiments of the present subject matter, as well as specific examples thereof, are intended to encompass equivalents thereof.

What is claimed is:

1. A method for configuring a payment card reader, the method comprising:

receiving, as an input from a merchant, a card via the payment card reader communicatively coupled to a point-of-sale (POS) terminal, the payment card reader and the POS terminal together forming a POS system for processing a payment transaction between the merchant and a customer;

obtaining, through a read circuitry of the payment card reader, read-data from the card;

comparing, via a processor of the POS terminal, a portion of the read-data with a proxy payment card syntax;

in response to obtaining a match between the portion of the read-data and the proxy payment card syntax, determining that the card is a proxy payment card, wherein the proxy payment card is representative of a plurality of potential payment object types that the merchant is to receive from customers in association with future transactions, and the plurality of potential payment object types including a magnetic stripe payment card, a Europay-Mastercard-Visa (EMV) payment card, and a near-frequency communication (NFC) payment card;

providing, based at least in part on determining the card is the proxy payment card and on a display of the POS terminal and through a graphical user interface (GUI), at least one interactive field for a specific type of payment object of the plurality of potential payment object types, wherein the interactive field is associated with a set of real-time configuration instructions for configuring at least one of the payment card reader or the POS terminal to accept a specific type of payment object as a valid method of payment;

receiving, through the processor, an interaction with the interactive field; and generating, based at least in part on the interaction with the interactive field and through a configuration component, the set of real-time configuration instructions which, when executed on at least one of the payment card reader or the POS terminal, configure the payment card reader or the POS terminal to accept the specific type of payment object as a valid method of payment.

2. The method of claim 1, wherein generating the set of real-time configuration instructions further comprises receiving, as input, a change in configuration of the payment card reader in response to the set of real-time configuration instructions.

3. The method of claim 2, further comprising:
determining whether the change matches a desired state of configuration; and
in response to obtaining a match between the change and the desired state of configuration, displaying a notification for successful configuration of the payment card reader to accept the specific type of payment object corresponding to the interactive field.

4. The method of claim 1, wherein the set of real-time configuration instructions relate to at least one of mode selected from a group of: a mode for setting-up the payment card reader to receive payment from one or more payment cards, a mode for creating a login account for the merchant to process the payment transaction, and a mode for registering the payment card reader with a payment processing system.

5. The method of claim 1, wherein the set of real-time configuration instructions relate to pairing the POS terminal to the payment card reader through a communication protocol selected from at least one of Bluetooth Low Energy, Bluetooth, Near-Field Communication, Quick-Response code technology, or Wi-Fi.

6. The method of claim 1, wherein receiving the specific type of payment object comprises one or more of dipping a payment card into an opening of the payment card reader, swiping the payment card within a slot of the payment card reader, tapping the payment card onto a surface of the payment card reader, or hovering the payment card proximate to the payment card reader.

7. The method of claim 1, further comprising customizing the set of real-time configuration instructions based on at least one of a distribution channel of the payment card reader, the merchant, a geographical location of the POS terminal, and a specific manner in which the specific type of payment object is received.

8. A method for initializing a payment object reader, the method comprising:
receiving, as an input from a merchant and according to a first type of interaction, an object via a payment object reader communicatively coupled to a point-of-sale (POS) terminal;
obtaining, via a read circuitry of the payment object reader, read-data from the object, wherein the read-data represents data stored on the object and indicates the first type of interaction according to which the object was received;
comparing, via a processor of the POS terminal, a portion of the read-data with a proxy payment object syntax;
in response to obtaining a match between the read-data and the proxy payment object syntax with the read-data, determining the object to be a proxy payment object representative of a plurality of potential payment objects that the merchant is to receive from customers in association with future transactions, wherein the payment object reader is configured to receive a first payment object of the plurality of potential payment objects according to the first type of interaction and configured to receive a second payment object of the plurality of potential payment objects according to a second type of interaction;
generating, through a configuration component and based at least in part on the first type of interaction according to which the proxy payment object was received, a set of configuration instructions which, when executed on the payment object reader or the POS terminal, configures the payment object reader or the POS terminal to accept the first payment object of a customer according to the first type of interaction to satisfy a subsequent payment transaction; and
receiving, according to the first type of interaction and subsequent to generating the set of configuration instructions, the first payment object to satisfy the subsequent payment transaction.

9. The method of claim 8, wherein the first payment object is at least one of a magnetic stripe payment card, a Europay-Mastercard-Visa (EMV) payment card, or a near-frequency communication (NFC) payment card.

10. The method of claim 8, wherein the set of configuration instructions includes instructions facilitating at least one of setting-up the payment object reader to receive payment from the first payment object, creating a login account for the merchant to process the subsequent payment transaction, or registering the payment object reader with a payment processing system.

11. The method of claim 8, wherein the set of configuration instructions includes re-positioning the payment object reader such that the payment object reader is in a communication field of the POS terminal.

12. The method of claim 8, wherein the set of configuration instructions include instructions to facilitate pairing the POS terminal to the payment object reader through a communication protocol selected from at least one of Bluetooth Low Energy, Bluetooth, Near-Field Communication, Quick-Response code technology, or Wi-Fi.

13. The method of claim 9, wherein the first type of interaction according to which the object was received comprises at least one of dipping the object into an opening of the payment object reader, swiping the object within a slot of the payment object reader, tapping the object onto a surface of the payment object reader, or hovering the object proximate to the payment object reader.

14. The method of claim 8, further comprising assigning a financial value to the proxy payment object, wherein the financial value increases with execution of the set of configurations.

15. The method of claim 8, further comprising:
determining the first payment object to be a payment object in response to obtaining a match between read-data associated with the first payment object and a payment object syntax;
determining a financial account of a customer based on the read-data; and
processing the payment transaction by causing transfer of a customer requested amount from the financial account of the customer to a financial account of the merchant.

16. The method of claim 8, wherein the comparing further comprises comparing at least one characteristic of the object with a corresponding stored template, wherein the characteristic is selected from at least one of dimensions of the object, a pattern on the object, or an anti-counterfeiting indicator on the object.

17. The method of claim 8, wherein:
the proxy payment object syntax corresponds to an account associated with an issuer of the proxy payment object; and
determining the object to be a proxy payment object further comprises determining an association between the account associated with the issuer and the read-data from the object.

18. A system for configuring a payment object reader, the system comprising:
a non-transitory computer-readable storage medium storing a set of instructions including instructions to store a proxy payment object syntax, wherein data read off a proxy payment object is in the proxy payment object syntax;
one or more processors being configured to:
obtain, via a read circuitry of the payment object reader, read-data from an object introduced in the payment object reader according to a first type of interaction, wherein the read-data represents data stored on the object and indicates the first type of interaction according to which the object was introduced;
compare a portion of the read-data with the proxy payment object syntax;
in response to obtaining a match between the read-data and the proxy payment object syntax, determine the object to be the proxy payment object representative of a plurality of potential payment objects, wherein the payment object reader is configured to receive a first payment object of the plurality of potential payment objects according to the first type of interaction and configured to receive a second payment object of the plurality of potential payment objects according to a second type of interaction;
generate, through a configuration component and based at least in part on the first type of interaction according to which the proxy payment object was introduced, a set of configuration instructions to configure at least the payment object reader to accept the first payment object of a customer according to the first type of interaction to satisfy a subsequent payment transaction; and
receive, according to the first type of interaction and subsequent to generating the set of configuration instructions, the first payment object to satisfy the subsequent payment transaction.

19. The system of claim 18, wherein the configuration component customizes the configuration instructions based on at least one of a distribution channel of the payment object reader, a buyer of the payment object reader, a geographic location of a point-of-sale terminal connected to the payment object reader, or the first type of interaction according to which the object was introduced.

20. The system of claim 18, wherein the first type of interaction according to which the object was introduced includes at least one of dipping the object into an opening of the payment object reader, swiping the object within a slot of the payment object reader, tapping the object onto a surface of the payment object reader, or hovering the object proximate to the payment object reader.

21. The system of claim 18, wherein the configuration component establishes a communication channel between a point-of-sale terminal and the payment object reader through a communication protocol selected from at least one of Bluetooth Low Energy, Bluetooth, Near-Field Communication, Quick-Response code technology, or Wi-Fi.

22. One or more non-transitory computer-readable media maintaining instructions that, when executed by one or more processors, program the one or more processors to:
obtain, via the processors, read-data from an object introduced in a payment object reader according to a first type of interaction, wherein the read-data represents data stored on the object and indicates the first type of interaction according to which the object was received;
compare, via the processors, a portion of the read-data with a proxy payment object syntax;
in response to obtaining a match between the proxy payment object syntax and the read-data, tag the object as a proxy payment object representative of a plurality of potential payment objects that the payment object reader is to receive in association with future transactions, wherein the payment object reader is configured to receive a first payment object of the plurality of potential payment objects according to the first type of interaction and configured to receive a second payment object of the plurality of potential payment objects according to a second type of interaction;
generate, through a configuration component and based at least in part on the first type of interaction according to which the proxy payment object was received, a set of configuration instructions which, when executed on the payment object reader or a point-of-sale (POS) terminal, configures at least one of the payment object reader or the POS terminal to accept the first payment object of a customer according to the first type of interaction to satisfy a subsequent payment transaction; and
receive, according to the first type of interaction and subsequent to generating the set of configuration instructions, the payment object to satisfy the subsequent payment transaction.

23. The one or more non-transitory computer-readable media as recited in claim 22, wherein the instructions further program the one or more processors to assign a financial value to the proxy payment object, wherein the financial value increases with execution of the set of configurations.

24. The one or more non-transitory computer-readable media as recited in claim 22, wherein the instructions further program the one or more processors to:
receive additional read-data associated with the first payment object of the plurality of potential payment objects;
determine that the first payment object is the first payment object in response to obtaining a match between the additional read-data and a payment object syntax;
determine a financial account of a customer based on the read-data; and
process the payment transaction by causing transfer of a customer requested amount from the financial account of the customer to a financial account of a merchant.

* * * * *